Nov. 1, 1966  L. R. ALEXANDER ETAL  3,282,733
PROCESS OF OPERATING A FUEL CELL UTILIZING INERT GAS
TO MAINTAIN PRESSURE DIFFERENTIAL
Filed March 30, 1961                    5 Sheets-Sheet 1

LAURENCE R. ALEXANDER
LEONARD J. RZEWINSKI
NICHOLAS CHARYSZYN
INVENTORS

BY
Watson, Cole, Grindle & Watson
ATTORNEYS

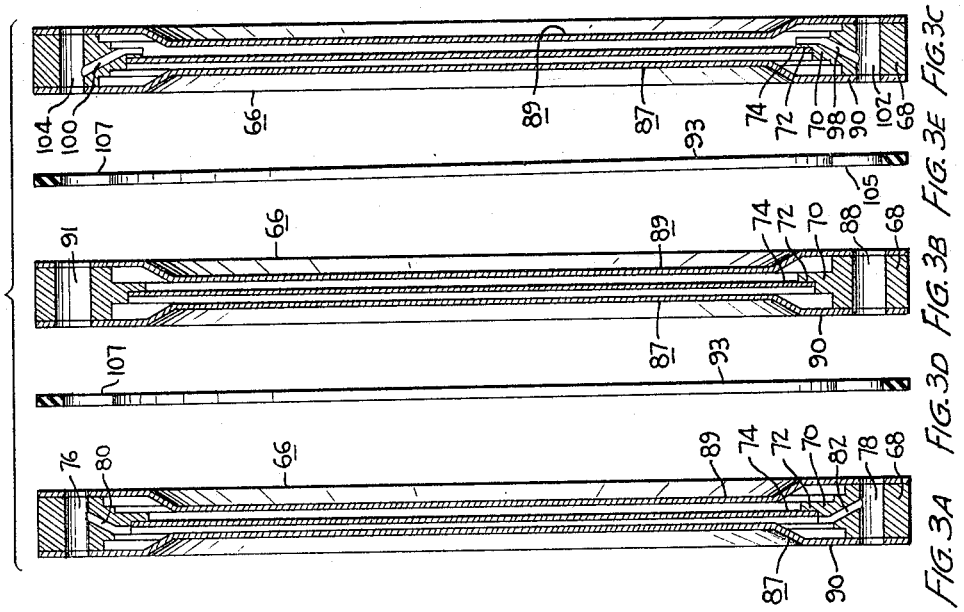
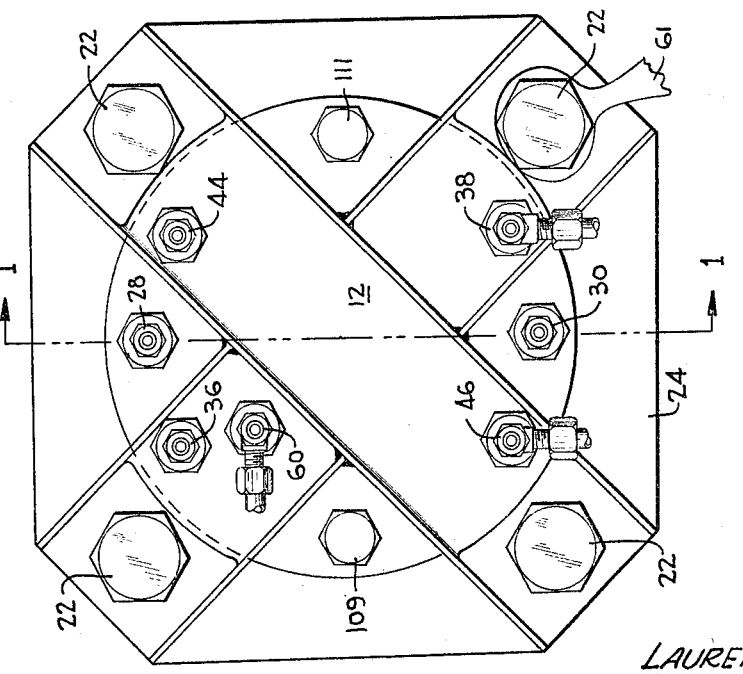

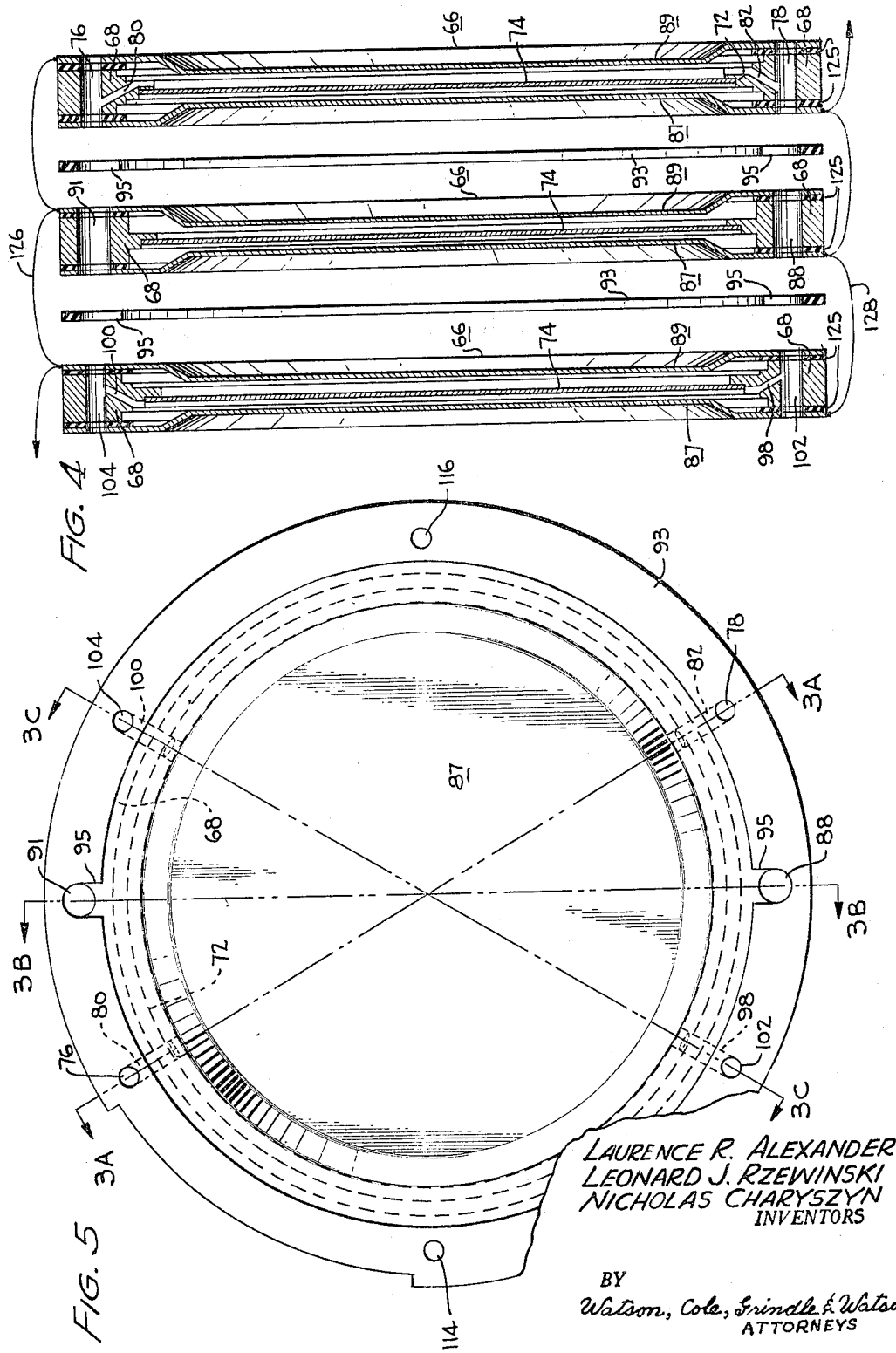

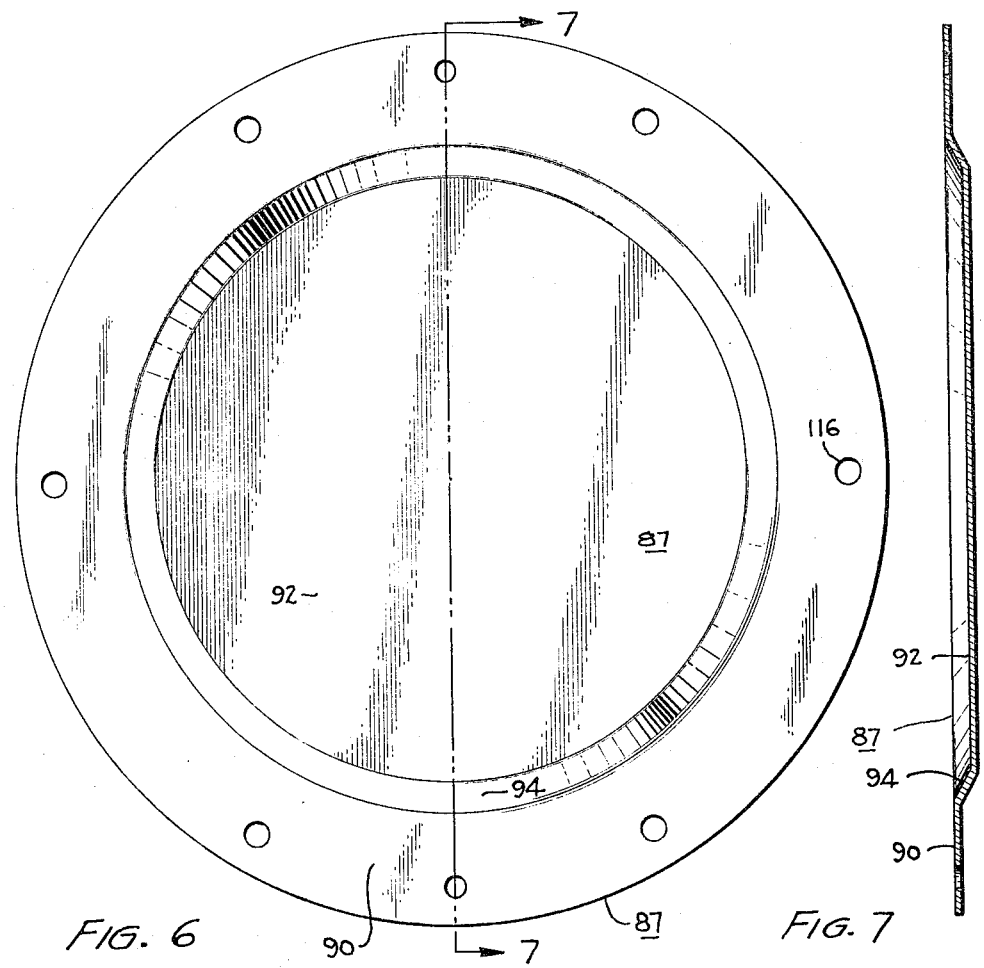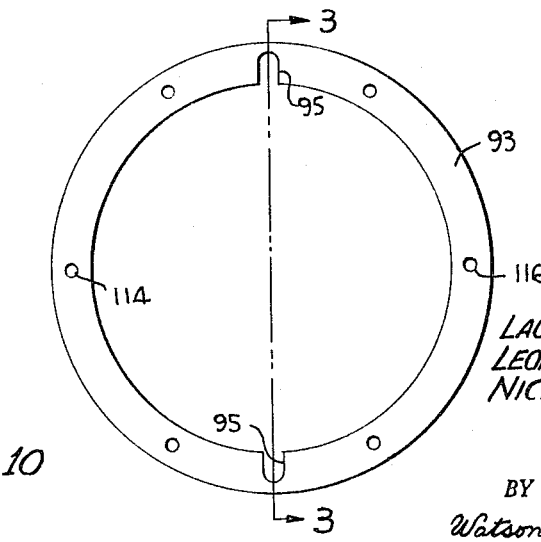

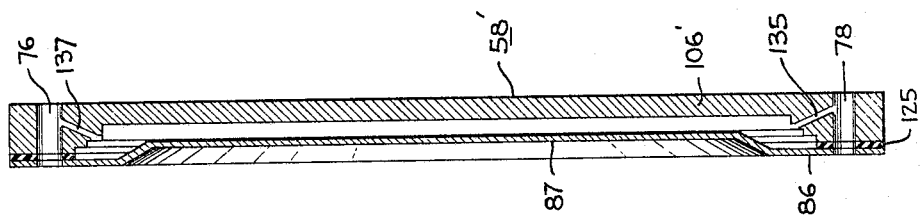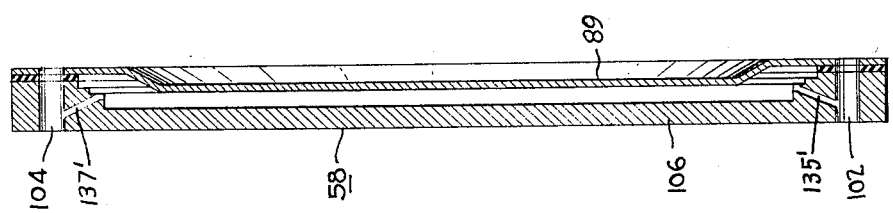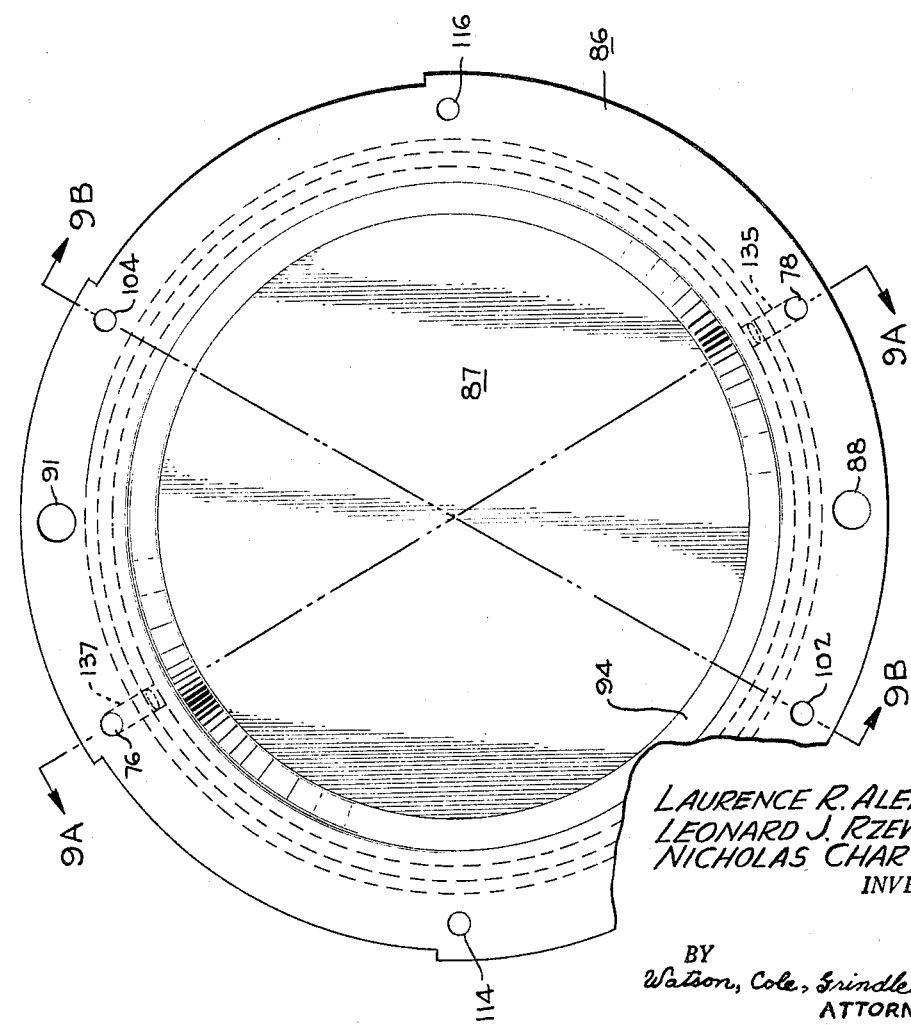

3,282,733
PROCESS OF OPERATING A FUEL CELL UTILIZING INERT GAS TO MAINTAIN PRESSURE DIFFERENTAL
Laurence R. Alexander, Greenwich, Conn., and Nicholas Charyszyn, Jamaica, and Leonard J. Rzewinski, Brooklyn, N.Y., assignors to Leesona Corporation, Cranston, R.I., a corporation of Massachusetts
Filed Mar. 30, 1961, Ser. No. 99,591
1 Claim. (Cl. 136—86)

This invention relates to a fuel cell and more particularly to an improved fuel cell construction.

Priorly, a bipolar type of electrode mount has been employed in a fuel cell in which electrodes of opposite polarity are mounted on a holder. In this known bipolar construction adjacent oxygen and hydrogen electrodes are formed on opposite sides of a common supporting plate, the outer surface of each electrode being in contact with the electrolyte while there is access for the respective gas between the inner surface of each electrode and the supporting plate. By using bipolar electrodes of this type a complete battery may be assembled with a very considerable saving of space. A number of bipolar electrodes are secured together to constitute a stack with the space between the adjacent electrodes filled with electrolyte, and gas introduced between the inner surface of each individual electrode and its supporting plate. This is made possible because with an assembly of individual cells the oxygen electrode of one cell is connected electrically to the hydrogen electrode of the next cell. In this known construction, one of the fuel cell gases is employed in the cylinder surrounding the cell to eliminate the pressure differential across seals in the cell assembly. The danger of leakage of this gas, however, makes this solution impractical.

Accordingly, it is an object of this invention to provide an improved fuel cell construction.

It is another object of this invention to provide an improved bipolar electrode construction.

It is another object of this invention to provide a fuel cell with an improved bipolar construction which is easy to fabricate, is reliable in operation, and contains a minimum of parts.

It is still another object of this invention to provide, in a fuel cell construction, a gas pressure seal around the active parts of the fuel cell, which seal reverses and reduces the pressure differential across the gaskets of the fuel cell.

It is another object of this invention to provide, in a fuel cell, an improved bipolar type of assembly which provides mechanical and electrical connections for the electrodes and is provided with gas and electrolyte distribution passages and a separator for maintaining separation between the gases.

It is another object of this invention to provide an improved construction for an electrode support in a bipolar type assembly which eliminates the disadvantages of fuel cells known in the art.

Briefly, in accordance with aspects of this invention, the fuel cell is comprised of a plurality of bipolar electrode units spaced from each other by means of gaskets. These units define mechanical and electrical connections for the electrodes and provide a gas separating seal between adjacent electrodes. Preferably, the bipolar units are circular and are separated by circular gaskets. The electrolyte is retained between the successive bipolar units by the previously mentioned gaskets. The entire group of bipolar assemblies is mounted in a suitable housing and spaced from the housing by means of gas sealing gaskets. A suitable inert gas such as nitrogen is introduced into the housing. Preferably, the pressure of the nitrogen or other inert gas in the housing is greater than the pressure of the gases, such as hydrogen and oxygen, employed in the generation of electricity. Accordingly, any leaks which occur in the gaskets which seal the electrolyte between the bipolar electrode assemblies will result in the passage of nitrogen inwardly to mix with generating gases of the fuel cell rather than the outward loss of the generating gases.

In accordance with other aspects of this invention, the periphery of the bipolar assemblies are provided with passages which extend in an axial direction through successive bipolar assemblies and the gaskets between assemblies. These axial passages communicate with certain radially directed passages in and between the bipolar assemblies to permit the intake and exhaust of the respective gases and electrolyte. For example, one axial passage may communicate through a suitable coupling in the generator housing and provide for the introduction of oxygen. This one axial passage communicates with passages adjacent each of the oxygen sinters, or oxidizing electrodes. In another portion of the periphery of the electrode assembly, a second gas passage extends axially of the assembly and communicates with a coupling through the housing. This second passage communicates with radial passages adjacent each of the hydrogen sinters, or reducing electrodes. Additional axial passages through the electrode assemblies are provided which communicate through radial passages with respective ones of the sinters, or electrodes, for the purpose of exhausting the respective gases from the bipolar mounts and assemblies.

In accordance with still other aspects of this invention, each bipolar assembly is provided with a mount, or support member, preferably in the form of an annular ring having a disc mounted centrally of the ring to define a gas separator between the electrodes. The electrodes are mounted, one on each side of the disc. The mounts are provided with a number of axial gas passages spaced around their periphery and these passages communicate through radial passages with the spaces between the electrodes and the separating disc of the assembly. These radial passages and the communicating axial passages are preferably positioned widely spaced, for example, diametrically opposite points on the periphery of the mount. For example, the oxygen intake passage may be diametrically opposite to the oxygen outlet passage and the hydrogen inlet passage will be diametrically opposite the hydrogen outlet passage.

In accordance with still another aspect of this invention, the annular gaskets which separate successive bipolar assemblies are provided with a pair of apertures which communicate with electrolyte passages through the bipolar mounts. Advantageously, these apertures are in the form of slots which open into the area within the annular gaskets. Accordingly, electrolyte may enter the region between adjacent electrodes at one aperture in the gasket and exit through the other aperture, which is preferably diametrically opposite from the first aperture.

In accordance with other aspects of this invention, the sinters which define the electrodes are mounted on the bipolar mount by means of annular disc-shaped plates. This annular plate has flanges which extend over the edges of the bipolar mount. The electrodes are welded, or otherwise secured, to the annular plates before the plates are secured to the mount. This is an important feature of the construction of the bipolar assembly since the respective hydrogen and oxygen electrodes must be subjected to distinct reducing and oxidizing atmospheres, respectively, before they are assembled. This wide flange plate also offers the advantage of providing a mechanical support to which it is unnecessary to weld the electrode after the plate is secured to the mount. In the prior art devices in which the electrode was welded to the mount, the welding operation had a deleterious effect on the electrode since the electrode could not be cooled during the welding operation, and the weld often exhibited leaks. These disadvantages, however, have been obviated by the use of the novel construction described above.

In accordance with aspects of another illustrative embodiment of this invention, the electrode supporting plate is spaced from the mount by means of an insulating gasket. Throughout the electrode assembly, conducting straps are employed to connect electrodes of like polarity such that the several cells are connected in series.

These and various other objects and features of this invention will be more clearly understood from a reading of a detailed description of this invention in conjuction with the drawing, in which:

FIGURE 2 is an end view of the embodiment of FIGURE 1 as viewed from the right-hand side of FIGURE 1;

Figure 1:
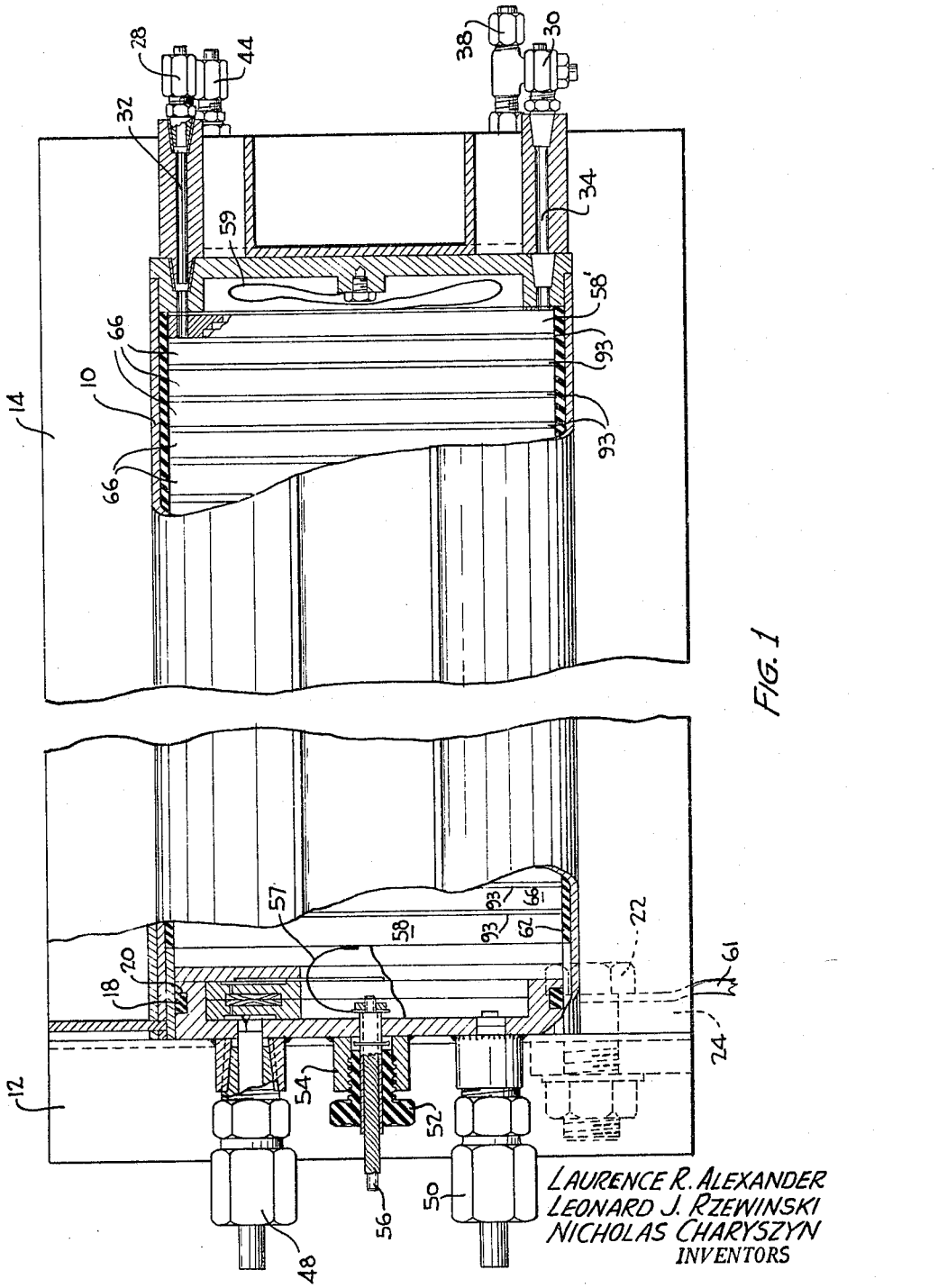
FIGURE 1 is a side view, partly in section, of the generator assembly of one illustrative embodiment of this invention.

FIGURES 3A, 3B, and 3C are details of FIGURE 1, in section, showing an abbreviated series of bipolar mounts in accordance with one illustrative series connected embodiment of this invention, taken along the lines 3A—3A, 3B—3B and 3C—3C of FIGURE 5, respectively;

FIGURES 3D and 3E are sectional views of the gasket of FIGURE 10, both taken along the line 3—3 of FIGURE 10;

FIGURE 4 is an abbreviated series of bipolar mounts with interspersed gaskets in accordance with an illustrative parallell connected embodiment of this invention;

FIGURE 5 is a plan view of the bipolar mount depicted in FIGURES 3 and 4;

FIGURE 6 is a plan view of the dish type electrode according to this invention;

FIGURE 7 is a view, in section, of the electrode of FIGURE 6 taken along the lines 7—7 of FIGURE 6;

FIGURE 8 is a plan view of the end plate mount, or end electrode mount, of the type employed in the embodiments of FIGURES 3 and 4;

FIGURES 9A and 9B are section views of the two end plate mounts of the type shown in FIGURE 8, the section of one end mount being taken along line 9A—9A, the section of the other end mount being taken along line 9B—9B; and FIGURE 10 is a plan view of a gasket which is inserted between the bipolar assemblies.

Referring now to FIGURE 1, there is depicted a side view, partly in section, of one illustrative embodiment of this invention in which a cylindrical tank 10 is employed as a principal part of a housing for the generator assembly. This tank is open at one end and is fitted with a gland 12 to enclose the cell components which comprise the generator. The exterior of the tank is preferably mechanically reinforced by a series of welded stiffeners. 14. An O-ring 18 fits in a recess 20 in the male portion of the gland and defines a fluid seal between the gland 12 and the tank 10. Numerous nut and bolt assemblies 22, for example, four, are employed to secure the flanges 24 of the tank 10 to the gland 12.

As shown in FIGURE 2 and on the right-hand portion of FIGURE 1, a pair of fluid couplings, 28 and 30 are provided which communicate with passages 32 and 34, respectively, to permit the entry and exhaust of the electrolyte. A second pair of ports 36 and 38 are provided which communicate through passages (not shown) with the interior of the cylinder. This second pair of ports may be employed for the feeding and exhausting of one of the gases, such as oxygen. As best seen in FIGURE 2, still another pair of ports 44 and 46 are provided which communicate through passages to the interior of the tank 10. This pair of ports may be employed for the introduction and exhaust of the other of the gases, such as hydrogen. These gas and electrolyte passages communicate with passages extending in an axial direction through the periphery of the electrode assemblies and particularly through the bipolar mounts in a manner which will be subsequently described. A pair of thermocouple connections 48 and 50, shown on the left-hand side of FIGURE 1, extend through the gland 12 for accurate temperature measurement of the interior of the fuel cell generator. The gland 12 is also provided with a bushing 52 which passes through a port 54 in the gland 12. This bushing is of insulating material and supports an electrical connector 56 which is connected by means of a strap 57 to one end electrode assembly 58 in the generator. The other electrical connection to the electrodes is made directly between the tank 10 and the other similar end electrode assembly 58' by strap 59. The external connection to the tank 10 may be made by any convenient means such as spade lug 61, mounted beneath one of the nut and bolt assemblies 22.

Advantageously, the tank 10 is provided on the right-hand end, as viewed in FIGURE 1, with an inlet port 60 for the introduction of an inert gas, such as nitrogen, within the tank between the electrode assemblies and the tank. The purpose of this gas is to reduce the pressure differential across the gaskets in the electrode assembly and to eliminate the hazards incident to the escape of the fuel cell gases in a manner which will be subsequently described.

Electric heaters, not shown, may be imbedded in thermal insulation and affixed to the exterior of the housing to provide for warm-up of the generator to start its operation. An insulating liner 62 is provided within the cylinder 10 electrically to insulate the electrode assembly from the tank 10. The tank 10 is preferably made of nickel, or nickel alloys, or other material to which a nickel plating may be applied because nickel is a material which resists caustic electrolyte such as potassium hydroxide.

The series connected electrode assembly include a series of bipolar assemblies 66, shown in FIGURES 3A to 3E to an enlarged scale. In FIGURE 3, an exploded group of bipolar assemblies 66 is shown. It is to be noted that FIGURES 3A, 3B, and 3C are views taken along different section lines, namely section lines 3A, 3B, and 3C, respectively, of FIGURE 5. FIGURES 3D and 3E are views taken along section line 3—3 of FIGURE 10. Each assembly includes an annular ring, or mount, 68 which has step-down flange 70 on its inner surface. On the innermost portion 72 of this step-down flange 70, there is welded, or otherwise secured, a gas separator plate 74. This gas separator plate is a partition which separates the respective gases on either side of the electrode assembly. The annular ring 68 is provided with a first pair of axially directed passages 76 and 78, shown in FIGURE 3A, which communicate with passages 36 and 38 of FIGURE 1. These passages 76 and 78 communicate with a pair of passages 80 and 82, respectively, which are directed radially inwardly and slightly angularly disposed for the intake and exhaust of one of the gases relative to one of the electrodes. Dish-shaped, wide flange electrodes 87 and 89 are mounted on opposite faces of the annular ring 68. The details of electrodes 87 and 89 are best seen in FIGURES 6 and 7. The electrodes 87, shown in FIGURES 6 and 7, which is identical with electrode 89, has a relatively wide flange 90 around the periphery and a dished portion 92 located centrally of the flange 90 and connected by an angularly disposed portion 94.

FIGURE 3 shows a series of bipolar mounts for assembly in electrical series relationship with interspersed insulating gaskets 93, electrode flanges 90 overlap the annular bipolar mount 68 and act as mechanical support and electrical connections for the dish-shaped electrodes, such as 87 and 89. The gas, such as hydrogen, passing through the passage 82 enters the region between electrode 87 and separator 74 and enters the pores, or passages, through the electrode 87 to form a three phase interface with the electrolyte between the surfaces of the electrode in a manner well known in the art, preferably without bubbling into the electrolyte. This electrolyte is fed through the bipolar assemblies 66 and end electrode assemblies 58 through axial passages 88 and 91, and entrapped by the gasket 93 between adjacent pairs of bipolar assemblies 66. Gasket 93 has "u" shaped notches 95 (FIG. 10) on its inner edge which communicate with passages 88 and 91 to permit the electrolyte to flow into the region between bipolar assemblies 66 and between the end electrode assemblies 58 and the adjacent bipolar assembly 66. Radially directed passages 98 and 100 in mount 68 communicate with axially directed passages 102 and 104, respectively, which, in turn, communicate with couplings 28 and 30, respectively, for the admission of the other of the gases, such as oxygen. The gasket 93 acts as an insulator between successive bipolar electrodes and serves as a seal to contain the pressurized electrolyte adjacent the electrodes.

As best seen in FIGURE 10, which is to a reduced scale, the gasket is provided with three pairs of circular apertures, two pairs of which are employed as gas conduits and one pair of oval slots 95 for the intake and exhaust of electrolyte between adjacent bipolar assemblies, which electrolyte is fed through passages 88 and 91 of the bipolar mount 66.

FIGURE 4 shows in section a parallel connected group of cells employing the bipolar mount arrangement. This arrangement is similar, and the respective sections are identical, to those of FIGURE 3 except that each of the electrodes 87 and 89 is insulated from the associated mount 68 by means of a gasket 125. The electrical connections are provided by straps 126 and 128, which lead out of the enclosing tank in the same manner as straps 57 and 59 of FIGURE 1. Straps 126 and 128 are connected to alternate electrodes in groups. For example, the electrodes connected to strap 126 are positive electrodes, while the group connected by strap 128 are negative electrodes.

In each embodiment, each end of the groups of bipolar mounts is defined by an end plate assembly 58, shown partially cut-away in FIGURE 8 and in section in FIGURE 9A. Assembly 58 includes an electrode such as 87 shown in full lines in FIGURE 8 and an end plate mount 106, shown in section in FIGURE 9A. In the instance of the opposite end, 58', as shown in FIGURE 9B, the mount is defined by end plate mount 106' and electrode 89. Each of these end plate assemblies 58 is insulatingly spaced from the adjacent bipolar mount by means of a gasket 93, as best seen in FIGURE 1. As shown in FIGURE 9A, passages 76 and 78 communicate with passages 135 and 137, respectively, to feed one gas to the region between electrode 87 and end plate mount 106'. In FIGURE 9B, which is a section view of the other end electrode assembly 58, passages 102 and 104 communicate with passages 135' and 137', respectively, to feed the other of the gases to the region between electrode 89 and end plate mount 106. The electrical connections for the series connected cell are defined by metallic straps 57 and 59, connecting end mount assemblies 58 to terminal 56 and the tank 10, respectively.

Prior to the assembly of the bipolar unit, the respective sinters 87 and 89 are subjected to oxidizing and reducing atmospheres, respectively, in a manner well known in the art, to effectively activate the electrodes. When the bipolar units are assembled they may be readily stacked on a pair of alignment bolts, such as bolts 109 and 111, shown in FIGURE 2, which pass through suitable alignment holes such as holes 114 and 116 in the bipolar mount 68 in FIGURE 5.

In FIGURE 8, the ports 102 and 104 pass directly through the end mount 106 and electrode 87, while the electrolyte passages 88 and 91 communicate through "u" gasket notches 95 with the end electrodes 87. Gas passages 76 and 78 are directed axially through end mount 106' and communicate with radially directed passages 135 and 137, respectively. In the opposite end mount, 106, the relationship of the gas passages will be reversed, i.e., passages 76 and 78 will pass directly through the mount while passages 102 and 104 will communicate with the region between the end mount 106 and the end electrode 89.

While we have shown and described two illustrative embodiments, it is understood that the concepts thereof could be applied to other embodiments without departing from the spirit and scope of this invention.

What is claimed is:

A process for the direct production of electrical energy from a fuel and oxidant in a ful cell comprising a fluid-tight housing, a plurality of bi-polar electrode assemblies mounted in a stack in said housing, each including an electrode mount having a pair of electrodes thereon, and a gas impermeable membrane between said electrodes, means for feeding fuel gases between said membranes and said electrodes, an end amount at each end of said stack of bi-polar assemblies having only one electrode thereon, fluid seals between each of said mounts for retaining electrolyte in an electrolyte chamber between adjacent electrodes of adjacent bi-polar assemblies and means for feeding electrolyte thereto, a gas space between said bi-polar assemblies and said fluid-tight housing, comprising the steps of (1) feeding fuel gases to said cell between said membranes and said electrodes; (2) feeding an electrolyte to said electrolyte chamber; (3) feeding an inert gas into said gas space between said bi-polar assemblies and said housing; and (4) maintaining the inert gas in said gas space at a pressure greater than the pressure of said fuel gases in said cell, thereby reducing the pressure differential on said fluid seals.

References Cited by the Examiner

UNITED STATES PATENTS

| | | | |
|---|---|---|---|
| 1,286,135 | 11/1918 | Sommermeier | 23—289 X |
| 2,928,783 | 3/1960 | Bacon | 204—283 |
| 2,937,923 | 5/1960 | Shapleigh | 23—288.92 X |
| 3,101,285 | 8/1963 | Tantram et al. | 136—86 X |

FOREIGN PATENTS 396,221  6/1924  Germany.

WINSTON A. DOUGLAS, *Primary Examiner.*

JOSEPH REBOLD, JOHN R. SPECK, *Examiners.*

H. FEELEY, A. B. CURTIS, *Assistant Examiners.*